G. H. PARKER.
BULLETIN BOARD.
APPLICATION FILED APR. 9, 1909.
962,164.
Patented June 21, 1910.
3 SHEETS—SHEET 3.
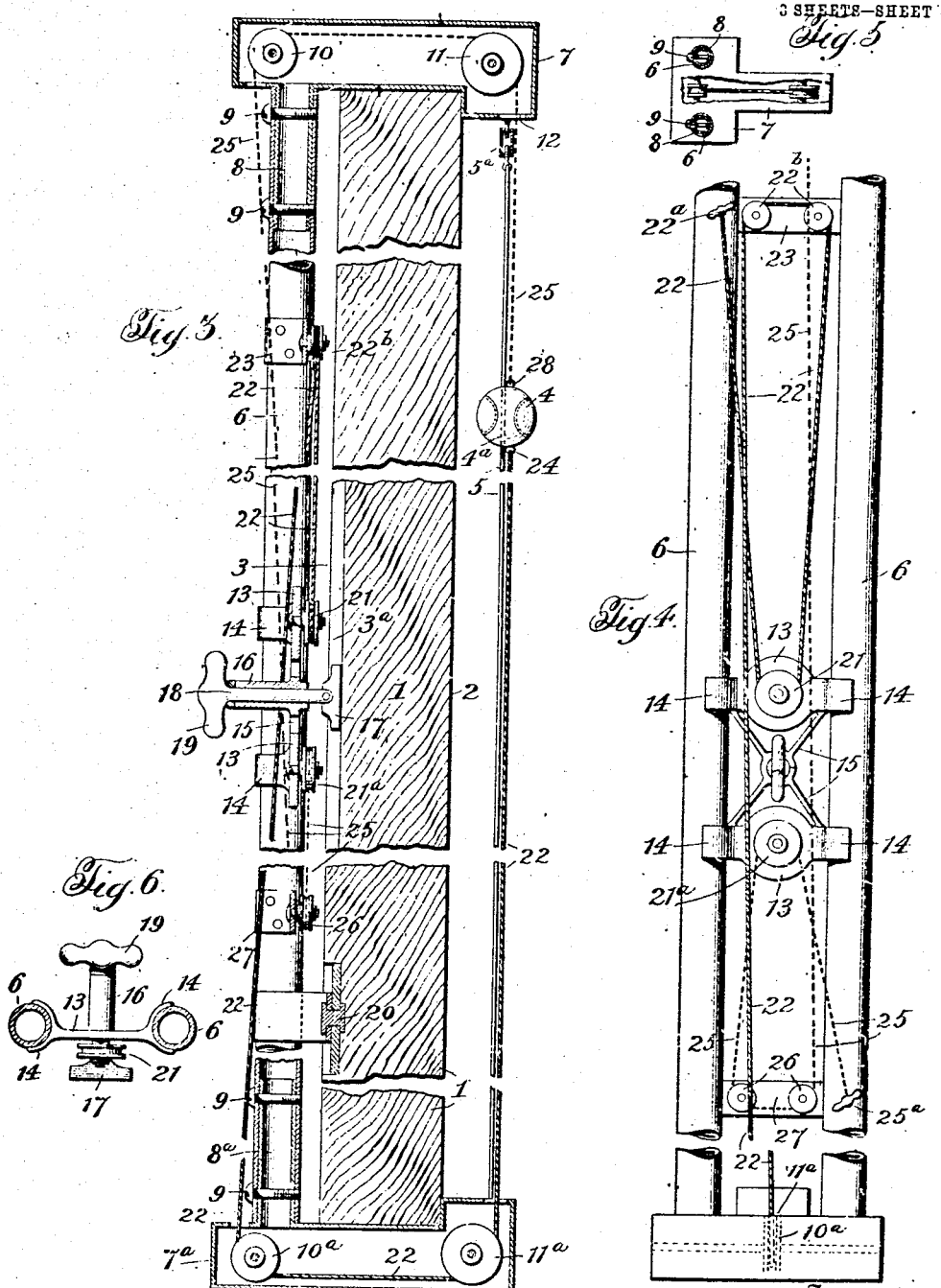

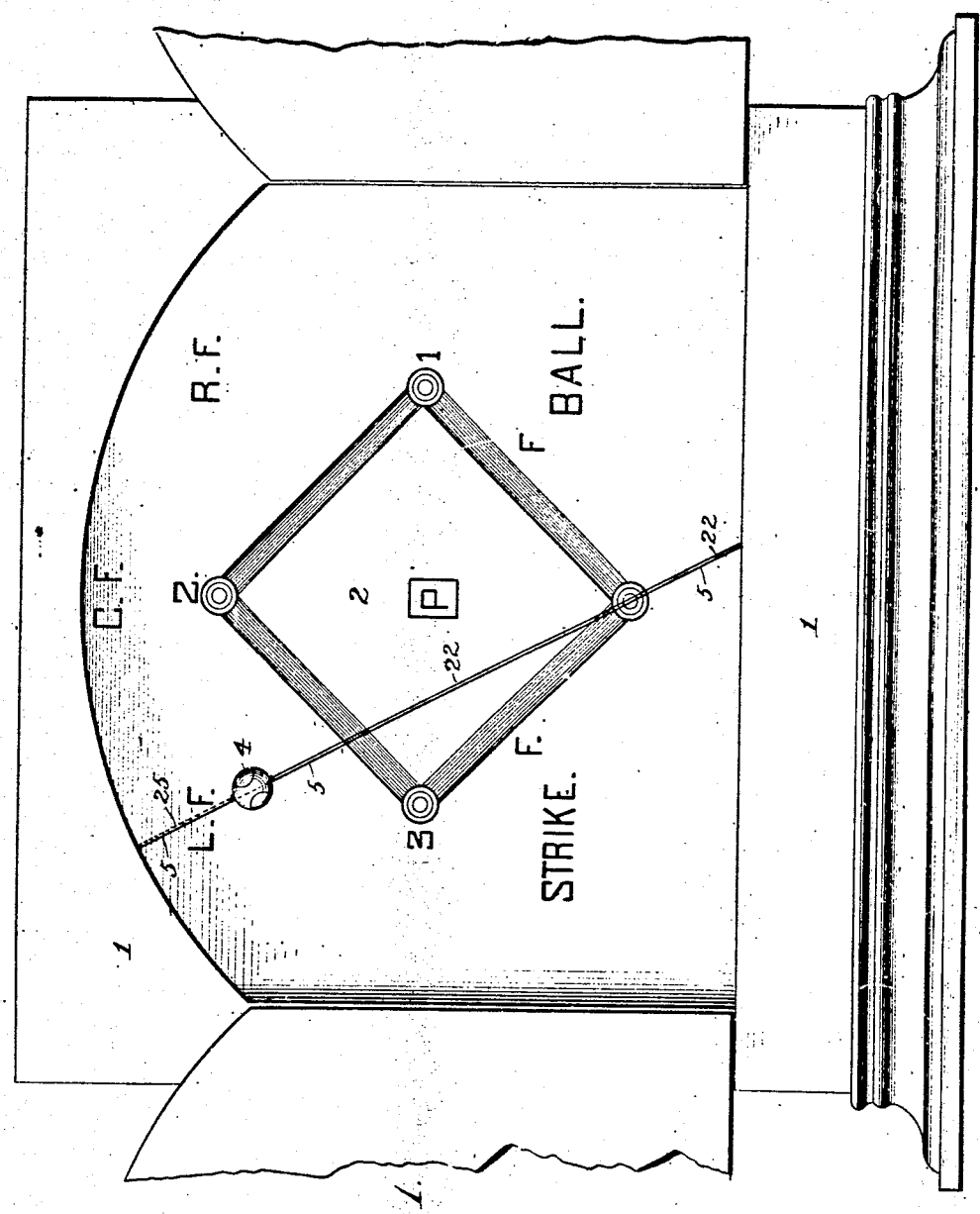

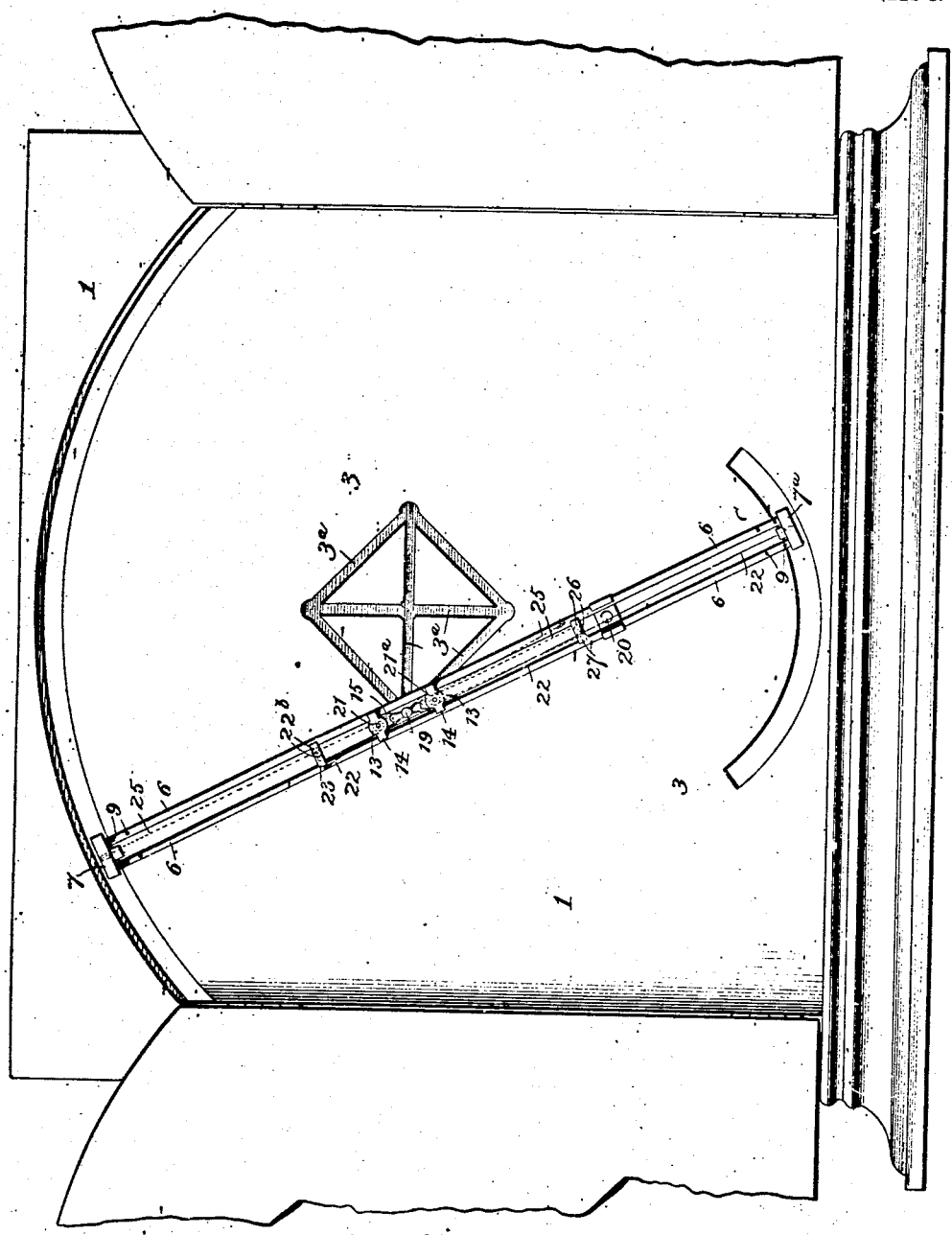

UNITED STATES PATENT OFFICE.

GEORGE HENRY PARKER, OF NEWARK, NEW JERSEY, ASSIGNOR TO JOHN W. BAKER, OF STAMFORD, CONNECTICUT.

BULLETIN-BOARD.   REISSUED 962,164.   Specification of Letters Patent.   Patented June 21, 1910.

Application filed April 9, 1909. Serial No. 488,862.

*To all whom it may concern:*

Be it known that I, GEORGE HENRY PARKER, a citizen of the United States, residing at Newark, in the county of Essex and State of New Jersey, have invented certain new and useful Improvements in Bulletin-Boards, of which the following is a specification, reference being had therein to the accompanying drawing.

This invention relates to game boards or bulletins of a character designed for the illustration graphically of the progress of a game such as base ball or foot ball.

It is the object of the invention to provide improved means whereby a ball or other indicator device may be shifted over a field representation on the board or bulletin, and this without the necessity of grooving the board or otherwise disfiguring or obstructing said field representation, and in carrying out this principle of operation, novel instrumentalities are included to so shift the ball or indicator from a point removed from the field representation surface of the board, say to the rear thereof.

The present structure is particularly useful where it is proposed to present a field representation enlarged for inspection at distances such as desired when placed on the stage in theaters, in front of newspaper offices, or on ball fields, in which event it is desired to provide means making it unnecessary for the arm of the operator to accompany the movement of the indicator over the enlarged surface of the field representation.

The invention includes a board having a field representation on the front thereof and an indicator adapted to play over the representation surface, an operating device to the rear of the field representation, and a member connecting with said indicator and operating device whereby as the operating device moves a certain distance over a given surface the indicator will be moved an extended distance over the field representation.

More particularly, the invention comprises a flexible member connecting respectively with the indicator and operating shoe carrying saddle, and associated means whereby as the operating device is adjusted the flexible member is given a circuitous movement to impart an increased adjustment of the indicator.

It is also contemplated by the invention to have an auxiliary field representation or guide to the rear of the field which may take the form of grooves, as in my copending application referred to, the said auxiliary representation constituting a guide for the operator and over which the operating device or shoe is adjusted, together with a novel means of support for the operating device or shoe which will permit the operator to accurately adjust the shoe and in turn the connected indicator to the precise point desired.

Other improvements and novel details in the construction and arrangement of the parts will be particularly referred to hereinafter, reference being directed in the consideration of this description, to the accompanying drawings forming a part hereof and wherein I have disclosed, for the purpose of illustration, one mode of application of the invention.

While in the illustrative drawings is shown the invention as applied for use in connection with a base ball field representation, I desire it understood that the invention is capable of different applications, and again, while I have shown the operating parts as mounted on a swinging or pivoted support, they may be otherwise mounted in carrying out the principle of operation.

In the drawings, Figure 1 is a front elevation of a bulletin board with my improvements applied, Fig. 2 is a rear view, Fig. 3 is a transverse vertical section, Figs. 4, 5 and 6 are detail views of parts removed.

Referring more particularly to the drawings, wherein like reference numerals refer to corresponding parts throughout the several views, 1 is a bulletin board or support proper, 2 a field representation on the front thereof, and 3 an auxiliary field representation to the rear thereof, which may be relatively small as shown, and having for convenience in adjustment of the operating device guide grooves $3^a$, extending between different points, as the bases and pitcher's and catcher's boxes. Adapted to play over the main field representation in a manner to be described, is an indicator 4 conveniently taking the form of a ball having a slot 4ᵃ therethrough by which it is sleeved upon for relative slidable movement, a guide wire or rod 5. To the rear of the board 1 is a carrying frame comprising oppositely disposed bars or posts 6, connected by suitable brace members which may constitute head and tail blocks 7 and 7ᵃ respectively. The head and tail blocks and the parts carried by each are of substantially similar construction and a description of one will suffice for the other, it being noted that the parts designated by numerals on the head block 7 are the same parts designated by corresponding numerals with an alphabetical exponent on the tail block 7ᵃ. The head block is of substantially rectangular construction and hollow having extending downwardly therefrom hollow lugs or projections 8, one upon each side adjacent the rear end thereof. To these projections 8 are adapted to be secured the respective bars or posts 6 of the carrying frame. A suitable means of connection is provided by making the bars 6 hollow and fitting the terminals thereof over the projections 8 and securing the interfitting parts by retaining devices 9.

A pulley 10 is mounted for free rotary movement within the head block at a point adjacent the hollow extension, and a substantially similar pulley 11 is mounted adjacent the forward end of the block and above an opening 12 therein. It is noted that the blocks 7 and 7ᵃ are adapted to fit over the upper and lower edges of the board 1 and that the forward ends thereof project beyond the front surface of the board. It is to these forward ends of the blocks that the guide wire 5 is connected, the wire being preferable in two sections and the adjacent terminals thereof threaded, whereby a connecting turn buckle 5ᵃ may be utilized for taking up any play or sagging of the wire.

The operating device for the indicator conveniently comprises the following parts: Oppositely disposed plates comprising body parts 13 with transversely curved ends 14 adapted to fit over the respective bars 6 of the frame, are provided, and the parts being so constructed that the plates may have a slidable engagement longitudinally of said frame posts 6. Relatively narrow cross brace bars or arms 15 connect with the said plates and a hollow tubular member 16, which may be of integral construction with the arms and plates, and the parts just referred to comprise an open or skeleton frame for the reception of a guide shoe 17 adapted to fit in the grooves of the auxiliary field representation 3, and having an extension 18 fitting within the hollow tube 16 for relative rotary and sliding movement and terminating in an operating handle 19, which handle may constitute not only means for engaging and disengaging the shoe 17 with the guide grooves, when the latter are used, but the means for sliding the shoe frame relative to the carrying frame members, and also moving the carrying frame 6, which is mounted for pivotal movement by means of a swivel connection 20 of any desired construction, with the board 1.

21 and 21ᵃ are loose pulleys mounted on the shoe frame or saddle, one upon each of the body parts 13, and preferably centrally thereof.

A cord or wire 22 is adjustably secured at one end to one of the bars 6 adjacent the upper end thereof and passes downwardly under the pulley 21, thence upwardly over the rotary pulleys 22ᵇ carried by a frame 23 extending between the frame bars, again downwardly over the pulleys 10ᵃ and 11ᵃ in the tail block 7ᵃ and finally upwardly over the front surface of the board 1 for connection with the lower surface of the ball indicator as at 24.

A substantially similar cord or wire 25 is adjustably connected to the opposite bar 6 adjacent its lower end and extends over the pulley 21ᵃ, around loose pulleys 26 carried by a frame 27 extending between the frame bars 6, again upwardly over the pulleys 10 and 11 in the head block, thence downwardly over the front surface of the board where it is connected to the upper surface of the ball as at 28.

From the construction just described, it will be appreciated that the cords or wires 22 and 25 follow a circuitous course with the result that a relatively short movement of the shoe, and carrying saddle will result in an increased or extended movement of the indicator ball 4 over the field representation on the front surface of the board.

Since it is desired that the indicator bar may be accurately positioned, I provide means for adjusting the cords or wires, conveniently comprising suitable thumb screws 22ᵃ and 25ᵃ, which constitute the means for securing the cords or wires to the frame bars 6, and which are adapted to turn and wind the cords or wires therearound to keep the same taut.

The operation may be briefly described as follows: It being borne in mind that the field representation on the front of the board 1 is substantially similar though enlarged, relative to that representation which constitutes a guide to the rear of the board, the operator grasps the handle 19, and if guide grooves are provided, properly inserts the shoe in the selected groove. He thereupon imparts movement to the shoe in the desired direction, along said grooves, the pivotal connection 20 of the supporting frame members 6 and the slidable movement between the latter and the saddle permitting adjustment of the shoe to any of the desired points. Now assuming that it be desired to impart upward movement to the ball indicator, the operator pushes the saddle and with it the shoe upward when the cord or wire 22 connected to the lower surface of the ball will permit the ball to rise and by reason of the loop of the cord or wire formed by the pulley 21 and coöperating guide pulleys 22ᵇ the cord or wire will permit a multiple movement of the ball, say twice that of the shoe. At the same time the coöperating cord or wire 25 will exert drawing or raising action to the indicator ball. Again, should the saddle be moved downward, the movement of the cord or wire will be reversed, with the same effect.

The structure just described makes it possible to convert a relatively short movement of the shoe over a guide representation into an extended movement over the main field representation, and the parts being accurately positioned and adjusted, the shoe and indicator will at all times maintain corresponding points on the respective fields regardless of the variance in the size of the fields.

The open or skeleton frame make up of the saddle makes it possible for the operator to always see the exact position assumed by the shoe with the result that the adjustment of the indicator will be more accurate than would be possible were the saddle made closed or solid and the shoe hidden from view. Again, the skeleton frame assists the operator in quickly adjusting the shoe into and out of the grooves of the auxiliary guide.

In the claims when I refer to the members 22 and 25 as a cord, I desire this term as including a wire or similar members operating in the manner specified.

Having thus described the invention what I claim as new and desire to secure by Letters Patent is:

1. In a ball bulletin board, the combination of a field representation at the front of the board, a field representation at the rear of the board, an indicator adapted to move to any part of the front field representation, a cord connected to the indicator, an element adapted to bodily move to any part of the rear field representation and having associated means directly engaging the cord, for differentially moving the element and indicator.

2. In an apparatus of the character described, the combination of a board having at the front thereof a representation, an indicator to move thereover, a lengthwise movable flexible member connected to the indicator, a bodily movable device arranged at a point removed from said representation and having associated means engaging the flexible member for moving the indicator in the same direction as the movable device at a different speed.

3. In an apparatus of the character described, the combination of a board having a field representation, a frame and an actuating element carried thereby arranged at the rear of the field, an indicator to move over the field surface, a cord connected to the indicator and extending beyond the field to the rear thereof and connected directly to said frame, and said cord engaging the element whereby said element and indicator move different distances at the same time.

4. In an apparatus of the character described, the combination of a field representation, an indicator, a flexible support for the indicator, bodily movable actuating means at the rear of the field for moving said flexible support, and associated means whereby the indicator moves an increased distance over the field relative to said means.

5. In an apparatus of the character described, the combination of a field representation, an indicator, a flexible support for the indicator extending in one direction beyond the bounds of the field, an auxiliary flexible support for the indicator extending in an opposite direction beyond the bounds of the field, bodily movable actuating means at the rear of the field for moving said flexible supports, and associated mechanism whereby the indicator moves an increased distance over the field relative to said means.

6. In an apparatus of the character described, the combination of a field representation, a supporting member positioned at a point removed from the field, an indicator adapted to play over the field, an actuating device for the indicator connected to said support and mounted to move bodily on said support, and means whereby a relatively short movement of the actuating device will result in an increased movement of the indicator.

7. In an apparatus of the character described, a field representation, an indicator to move thereover, a guide or runway positioned at a point beyond the bounds of the field, a carriage or shoe mounted on said runway, and connections between the carriage or shoe and indicator whereby a movement of the carriage or shoe will result in an extended movement of the indicator.

8. In an apparatus of the character described, a movable indicator, a board over which the indicator passes, a guide, a device mounted to move on said guide, and means whereby a movement of the device on said guide a given distance will result in a movement of the indicator a different distance.

9. In an apparatus of the character described, the combination of a board having thereon a field representation, an elongated guide, a device mounted on the guide for movement, a guide surface for the device, an indicator to play over the field representation, and connections between the device and indicator whereby a relatively short movement of the device will result in an increased movement of the indicator.

10. In an apparatus of the character described, the combination of a field representation, a movable supporting frame, an indicator to move over the field representation, an actuating device mounted to move back and forth on said frame, and means whereby the device and indicator move at different speeds.

11. In an apparatus of the character described, the combination of a field representation, a swinging supporting frame, an indicator to move over the field representation, an actuating device mounted to move back and forth on said frame, and means whereby the device and indicator move at different speeds.

12. In an apparatus of the character described, the combination of a field representation, an indicator to play thereover, a lengthwise movable support for the indicator, an operating device for moving said support arranged at a point removed from the bounds of the field, associated instrumentalities whereby the operating device and indicator move in the same direction different distances at the same time, a guide surface for the operating device, and a movable carrying frame for the operating device.

13. In an apparatus of the character described, the combination of an indicating surface, an indicator adapted to play over the said surface, a support, a flexible member connected at one end to said support and at its opposite end to the indicator, and an operating device engaging said flexible member intermediate its ends.

14. In an apparatus of the character described, the combination of a field representation, an indicator adapted to play over the surface of the same, a support, a flexible member connected at one end to said support and at its opposite end to the indicator, an operating device engaging said flexible member intermediate its ends, and an auxiliary field representation constituting a guide surface for said operating device.

15. In an apparatus of the character described, the combination of a field representation, of a guide surface, an indicator adapted to play over the field representation, an operating shoe adapted to play over the guide surface, a support, a cord connected at one end to said support and at its opposite end to the indicator, and an anti-friction bearing on the shoe adapted to be engaged by the cord whereby the indicator is operated by the movement of the shoe.

16. In an apparatus of the character described, the combination of a field representation, a suitable support to the rear of the field, an indicator adapted to play over the field surface, a device movable relative to the support, a flexible member connected at one end to the support and at its opposite end to the indicator, and guiding means for said flexible member mounted on the device and support respectively, and acting through said flexible member to move the indicator an increased distance relative to the device.

17. In an apparatus of the character described, the combination of a field representation of an indicator adapted to play thereover, a support, a cord connecting with the indicator at one end and secured to said support at its opposite end, and means movable on said support engaging the cord intermediate its ends for moving the indicator relative to said field.

18. In an apparatus of the character described, a field representation, a pivoted supporting member, an indicator adapted to play over the field representation, a flexible member secured to the supporting member adjacent one end and connected to the indicator, and means movable relative to the support and engaging said flexible supporting member intermediate its ends for moving the indicator an increased distance relative to said means.

19. In an apparatus of the character described, the combination of a field representation, of an auxiliary field representation, a suitable support adjacent the auxiliary field representation, an indicator adapted to play over the main field representation, a shoe movable on the support adapted to play over the auxiliary representation, a flexible member adjustably connected to said support adjacent one end and connected to the indicator adjacent its opposite end, and an operative connection between said cord and shoe whereby as the shoe operates over the auxiliary field the indicator will operate over the main field.

20. In an apparatus of the character described, the combination of a field representation, an indicator to move thereover, a flexible member connected to the indicator and projecting in one direction beyond the bound of the representation, an auxiliary flexible member connected to the indicator and projecting in an opposite direction beyond the bounds of the representation, and a bodily movable operating member operatively connected to both flexible members for moving the indicator a different distance relative to the operating member, and a guide surface of the operating member.

21. In an apparatus of the character described, a field representation, an indicator to move thereover, a support connected at one end to the indicator and projecting in one direction beyond the bounds of the field, an auxiliary support connected to the indicator and projecting in an opposite direction beyond the bounds of the field, and a bodily movable member having associated means engaging said supports for moving the indicator in the same direction as the movable member different distances during the same time.

22. In an apparatus of the character described, the combination of a field representation, an indicator adapted to play thereover, and an operating device for the indicator including oppositely disposed body parts, a tubular member between said body parts, arms connecting respectively with said tubular member and body parts, a shoe carried by the tubular member, and a guide surface for the shoe.

23. In an apparatus of the character described, the combination of a field representation, an indicator adapted to play thereover, an operating shoe slidably mounted at the rear of the field, rollers on the shoe, a support, cords secured at one end to said support and passing around said rollers whereby the same is operated by the shoe, and a connection between the cords and indicator.

24. In an apparatus of the character described, the combination of a field representation, a support, an indicator adapted to play over the field surface, a shoe movable relative to the support, a flexible member connected at one end to the support and at its opposite end to the indicator and guide pulleys for said flexible member mounted on the shoe and support respectively.

25. In an apparatus of the character described, the combination with a board member, an indicator adapted to be moved across the face thereof, a carrier for the indicator comprising a frame located at the rear of the board, a movable actuating device on the carrier frame, pulleys on the said actuating device, pulleys on the carrier frame, and flexible means to which the indicator is connected passing around said pulleys on the actuating device and over the pulleys on the frame.

26. In an apparatus of the class described, the combination with a board member, of a movable frame member, an actuating device slidable longitudinally on the frame member, an indicator arranged at the front of the board, and means interposed between the indicator and the frame and associated with said actuating device whereby upon the movement of the actuating device the indicator is moved a distance greater than the distance of the movement of the actuating device.

27. In an apparatus of the class described, the combination with a board member having guide grooves, of a movable frame member, an actuating device slidable longitudinally on the frame member, an indicator arranged at the front of the member, and means interposed between the indicator and the frame and associated with said actuating device whereby upon the movement of the actuating device the indicator is moved a distance greater than the distance of the movement of the actuating device, and a movable shoe carried by the actuating device adapted to engage the guide grooves.

In testimony whereof I affix my signature in presence of two witnesses.

GEORGE HENRY PARKER.

Witnesses:
 REINHOLD VONDER AA,
 GARRIE VAN PELT.